No. 709,702. Patented Sept. 23, 1902.
B. W. FELLOWS.
ROTARY ENGINE.
(Application filed June 21, 1901. Renewed May 28, 1902.)

(No Model.) 3 Sheets—Sheet 1.

WITNESSES
J. Smgg Poole
Wm. N. Bates

INVENTOR
Byron W. Fellows.
by Herbert W. T. Jenner.
Attorney

THE NORRIS PETERS CO., PHOTO-LITHO., WASHINGTON, D. C.

No. 709,702. Patented Sept. 23, 1902.
B. W. FELLOWS.
ROTARY ENGINE.
(Application filed June 21, 1901. Renewed May 28, 1902.)
(No Model.) 3 Sheets—Sheet 2.

No. 709,702. Patented Sept. 23, 1902.
B. W. FELLOWS.
ROTARY ENGINE.
(Application filed June 21, 1901. Renewed May 28, 1902.)
(No Model.) 3 Sheets—Sheet 3.

WITNESSES
INVENTOR
Byron W. Fellows
by Herbert W. T. Jenner.
Attorney

UNITED STATES PATENT OFFICE.

BYRON W. FELLOWS, OF BEVERLY, MASSACHUSETTS.

ROTARY ENGINE.

SPECIFICATION forming part of Letters Patent No. 709,702, dated September 23, 1902.

Application filed June 21, 1901. Renewed May 28, 1902. Serial No. 109,393. (No model.)

*To all whom it may concern:*

Be it known that I, BYRON W. FELLOWS, a citizen of the United States, residing at Beverly, in the county of Essex and State of Massachusetts, have invented certain new and useful Improvements in Rotary Engines; and I do hereby declare the following to be a full, clear, and exact description of the invention, such as will enable others skilled in the art to which it appertains to make and use the same.

This invention relates to rotary engines; and it consists in the novel construction and combination of the parts hereinafter fully described and claimed.

Figure 1:
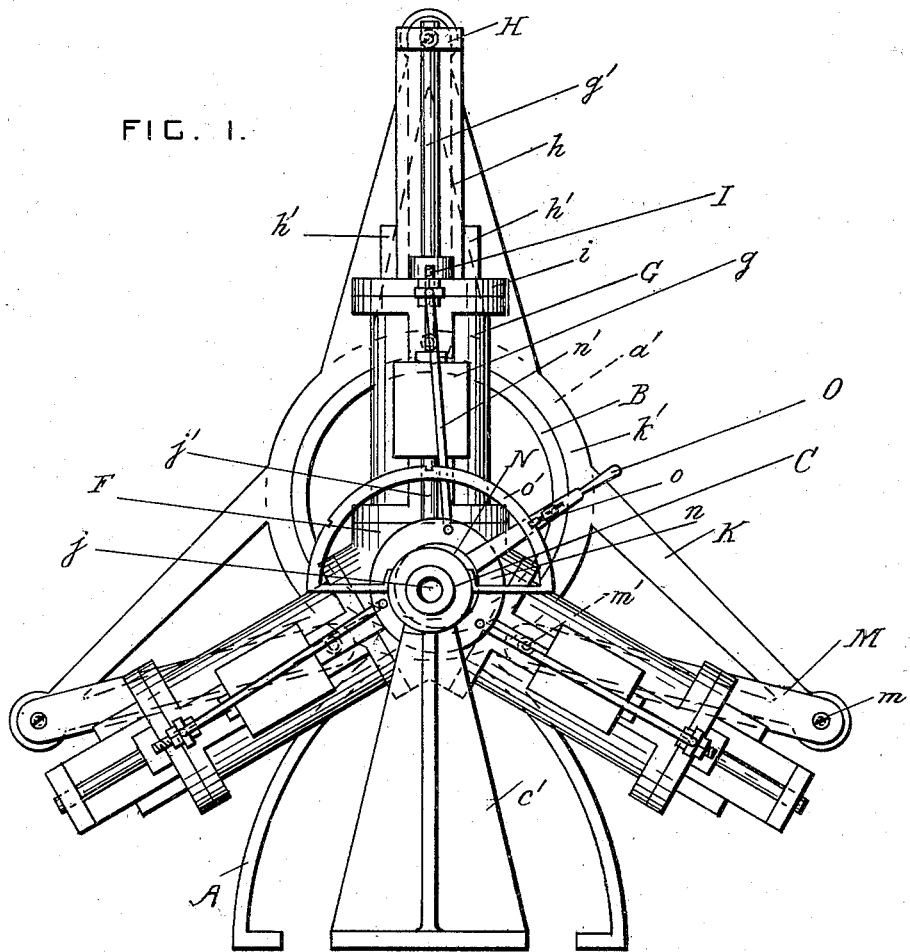
Figure 2:
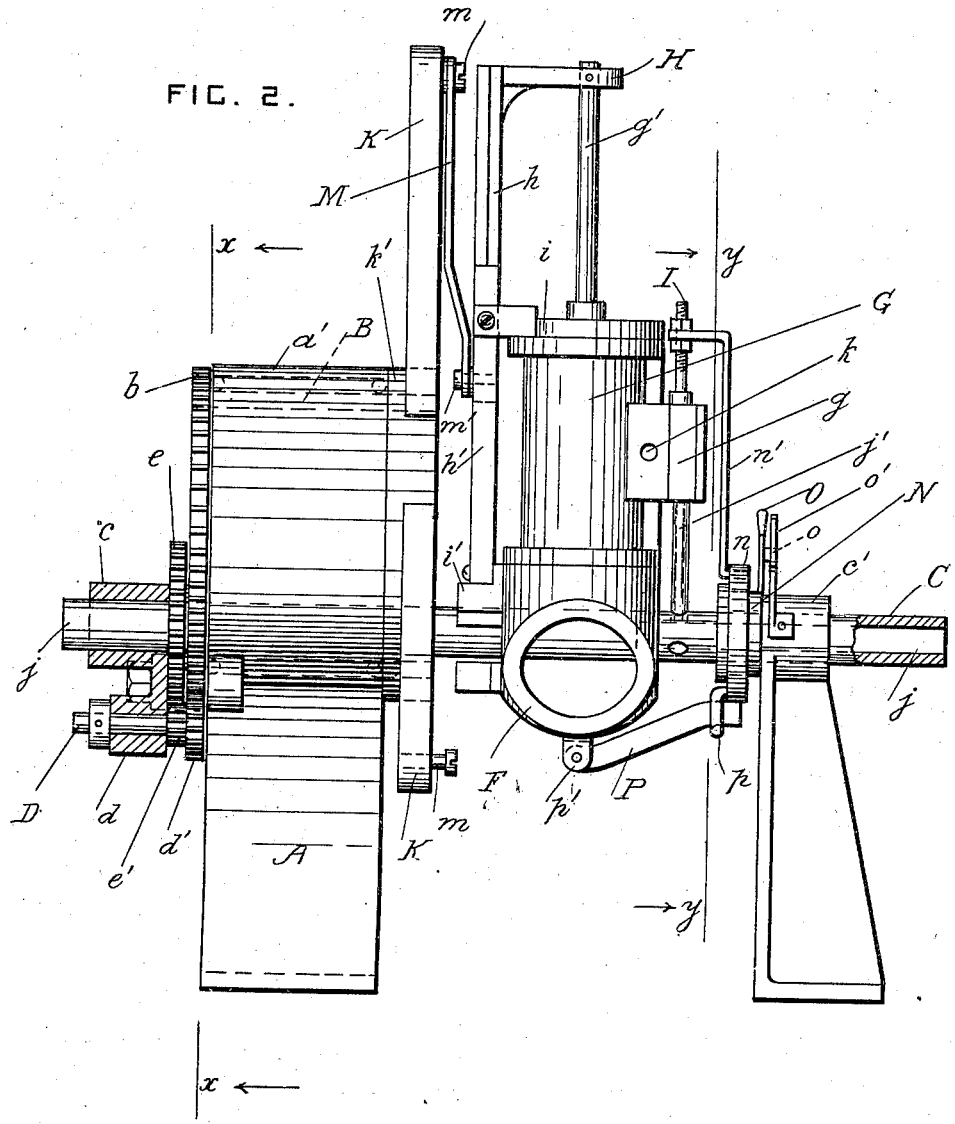
Figure 3:
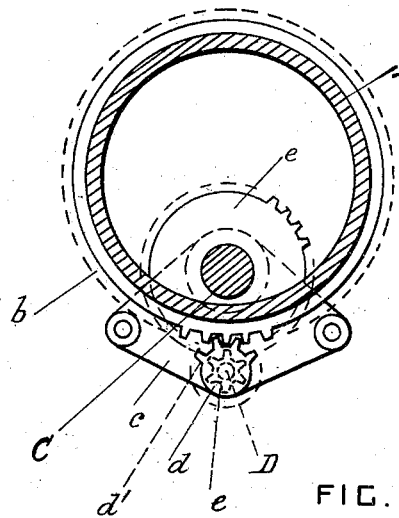
Figure 4:
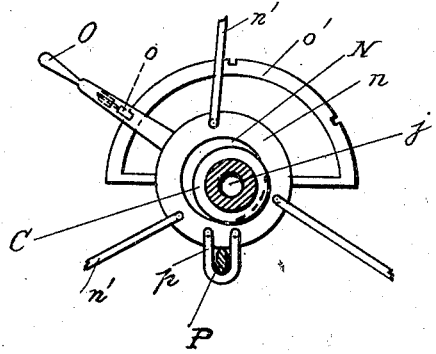
Figure 5:
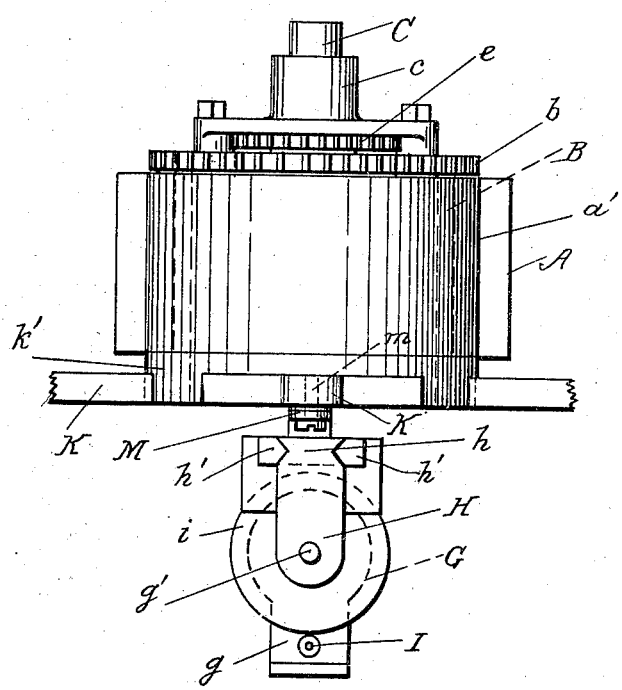

In the drawings, Figure 1 is a front view of the engine; and Fig. 2 is a side view, certain parts being removed for clearness. Fig. 3 is a section on line $x\ x$ in Fig. 2, showing the gearing. Fig. 4 is a section on line $y\ y$ in Fig. 2, showing the eccentric and the parts coöperating with it. Fig. 5 is an end view of one of the cylinders.

A is a main standard provided with a large circular bearing $a'$.

B is a sleeve which is journaled in the bearing $a'$ and provided with a toothed ring $b$ at its periphery outside one end of the bearing $a'$. The bearing $a'$ is preferably provided with antifriction devices, such as balls, and it is of any approved construction.

C is the engine-shaft, which passes through the sleeve B and which is arranged eccentric of the center or axis of the said sleeve. The shaft C is journaled in a bracket $c$, secured to the main standard A, and in an out-end bearing $c'$, which is supported in any approved manner.

In the lower part of the bracket $c$ a bearing $d$ is formed, and D is a shaft which is journaled in the bearing $d$. A toothed pinion $d'$ is secured on the shaft D and gears into the toothed ring $b$. A toothed wheel $e$ is secured on the engine-shaft C and gears into a toothed pinion $e'$, which is secured on the shaft D. The toothed ring $b$, the toothed wheel $e$, and the toothed pinions $d'$ and $e'$ are proportioned so that when the sleeve B is revolved in the main bearing $a'$ the engine-shaft C is constrained to revolve at the same speed and in the same direction as the said sleeve.

F is a triple head which is secured on the engine-shaft C. Three similar power-cylinders G are provided, and these cylinders are secured to the said head at equal distances apart and radially of the shaft C. These power-cylinders are provided with valve-chests $g$ and piston-rods $g'$.

H represents cross-heads, which are secured to the piston-rods and provided with slides $h$, which project from the cross-heads alongside the cylinders and slide in guides $h'$. The guides $h'$ are secured to the cylinder-covers $i$ and to lugs $i'$, which project from the head F.

I represents the valve-spindles. The cylinders are double acting, and the slide-valves are of approved construction, each cylinder being provided with two steam-ports and an exhaust-port between them in the usual manner.

The engine-shaft C has a passage or hole $j$ formed centrally in it, and this hole is connected with the boiler in any approved manner and forms a portion of the steam-supply pipe. Three distributing-pipes $j'$ are provided and connect the hole or pipe $j$ with the steam-chests of the three cylinders. Each steam-chest has an exhaust outlet-opening $k$, which communicates with the atmosphere in any approved manner. If desired, the exhaust-openings $k$ may be connected with a second axial passage or hole in the engine-shaft by distributing-pipes in a similar manner to the connection of the steam-pipe, and the exhaust-steam can be let out of the rear end of the engine-shaft.

K represents three arms provided with a hub $k'$, which is secured on the other end of the sleeve B from the toothed ring $b$.

M represents three connecting-rods, which are pivoted to the free end portions of the arms K by pins $m$ and to the inner end portions of the slides $h$ by pins $m'$.

The steam is admitted to the cylinders and propels the piston-rods back and forth, so that the sleeve B is revolved by means of the arms K and connecting-rods M. Two cylinders are always in action, while the valve of the third is on its center, so that the sleeve and the engine-shaft revolve continuously as long as steam is supplied. If desired, the cylinders can be arranged to work the same as those of a triple-expansion engine, the steam being admitted to one cylinder after the other by any approved arrangement of pipes and passages. The engine will also work with compressed air instead of steam. The three slide-valve spindles are operated by a single eccentric N, which is mounted loosely on the engine-shaft C, adjacent to the out-end bearing $c'$. An eccentric-strap $n$ is provided, and $n'$ represents eccentric-rods which operatively connect the three valve-spindles with the eccentric-strap.

O is a reversing-lever which is secured to the eccentric, and $o$ is a catch which locks the lever O to a toothed quadrant $o'$. The direction of the revolution of the engine is determined by the position of the eccentric, and the engine is reversed by moving the lever O from one end of the quadrant to the other. The quadrant is secured to the out-end bearing $c'$ or to any other approved support. In order to constrain the eccentric-strap to revolve with the engine-shaft and to give it the freedom of motion necessary to permit the engine to be reversed, the eccentric-strap $n$ is provided with a projecting loop $p$.

P is an arm which is pivoted at one end to a bracket $p'$ on the head F between two of the cylinders. The other end portion of the arm P engages with the loop $p$ and prevents the eccentric from being revolved by frictional contact with the engine-shaft.

This engine does not require any fly-wheel, and as it can be started, reversed, and stopped instantaneously by the lever O it is well adapted to drive launches, automobiles, and many other machines to which an ordinary steam-engine with a fly-wheel cannot satisfactorily be applied.

What I claim is—

1. The combination, with a main bearing, and a sleeve journaled in it and provided with projecting arms; of an engine-shaft journaled eccentric of the said sleeve, power-cylinders mounted on the said shaft and operatively connected with the said arms whereby the said sleeve is revolved, and toothed wheels connecting the said shaft and sleeve and constraining them to revolve at the same speed and in the same direction, substantially as set forth.

2. The combination, with a main bearing, and a sleeve journaled in it and provided with projecting arms; of power-cylinders secured to the said shaft and provided with piston-rods, guides arranged alongside the said cylinders, cross-heads secured to the piston-rods and provided with slides which work in the said guides, and connecting-rods between the said slides and the projecting arms, substantially as set forth.

3. The combination, with a main bearing, and a sleeve journaled in it and provided with projecting arms; of an engine-shaft journaled eccentric of the said sleeve and provided with an axial steam-passage, power-cylinders provided with steam-chests and mounted on the said shaft, steam-pipes connecting the said steam-chests with the said passage in the shaft, connections between the said cylinders and arms whereby the said sleeve is revolved, and toothed wheels connecting the said shaft and sleeve, substantially as set forth.

4. The combination, with a revoluble engine-shaft, of three power-cylinders secured to the said shaft and provided with valve-spindles, an eccentric mounted on the said shaft and provided with a single eccentric-strap, means for preventing the said eccentric from revolving with the engine-shaft, a jointed driving device which connects the said eccentric-strap with the said shaft so that the strap is revolved by the shaft, and eccentric-rods operatively connecting the said eccentric-strap with the valve-spindles, substantially as set forth.

5. The combination, with a revoluble engine-shaft, of three power-cylinders secured to the said shaft and provided with valve-spindles, an eccentric mounted on the said shaft and provided with a single eccentric-strap, eccentric-rods operatively connecting the said eccentric-strap with the valve-spindles, a jointed driving device which connects the said eccentric-strap with the said shaft so that the eccentric may be moved to reverse the engine and so that the said eccentric-strap is revolved by the said shaft, a reversing-lever secured to the eccentric, a stationary quadrant, and a catch for connecting the said lever and quadrant, substantially as set forth.

6. The combination, with a revoluble engine-shaft, of three power-cylinders secured to the said shaft and provided with valve-spindles, an eccentric mounted on the said shaft, means for preventing the eccentric from revolving with the engine-shaft, an eccentric-strap provided with a projecting loop, an arm pivotally connected with the shaft and engaging with the said loop whereby the eccentric-strap is constrained to revolve with the shaft, and eccentric-rods operatively connecting the said eccentric-strap with the valve-spindles, substantially as set forth.

In testimony whereof I affix my signature in presence of two witnesses.

BYRON W. FELLOWS.

Witnesses:
ALICE J. MURRAY,
FRED. K. DAGGETT.